(12) United States Patent
Yokoyama et al.

(10) Patent No.: US 11,108,218 B2
(45) Date of Patent: Aug. 31, 2021

(54) GROMMET

(71) Applicants: Yazaki Corporation, Tokyo (JP); TOYOTA JIDOSHA KABUSHIKI KAISHA, Toyota (JP)

(72) Inventors: Satoshi Yokoyama, Toyota (JP); Kazuyuki Kumoi, Toyota (JP); Akihito Kouketsu, Kariya (JP); Masanori Suzumura, Kariya (JP); Kiyotsugu Miura, Kariya (JP)

(73) Assignees: YAZAKI CORPORATION, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/444,544

(22) Filed: Jun. 18, 2019

(65) Prior Publication Data
US 2019/0393687 A1   Dec. 26, 2019

(30) Foreign Application Priority Data

Jun. 22, 2018   (JP) .............................. JP2018-118963

(51) Int. Cl.
*H02G 3/04* (2006.01)
*H02G 3/22* (2006.01)
*B60R 16/02* (2006.01)

(52) U.S. Cl.
CPC ....... *H02G 3/0456* (2013.01); *B60R 16/0222* (2013.01); *H02G 3/0418* (2013.01); *H02G 3/0462* (2013.01); *H02G 3/22* (2013.01)

(58) Field of Classification Search
None
See application file for complete search history.

(56) References Cited

U.S. PATENT DOCUMENTS

| | | | | |
|---|---|---|---|---|
| 2,297,735 A * | 10/1942 | Allen | ...................... | B26B 19/44 30/133 |
| 2,425,823 A * | 8/1947 | Parsons | .................. | B62D 25/04 49/167 |
| 2,620,708 A * | 12/1952 | Anderson | ............... | B60R 1/064 74/502.1 |
| 2,625,579 A * | 1/1953 | Frazee | .................... | H01T 13/06 174/77 S |
| 2,946,839 A * | 7/1960 | Horning | .................. | H01R 4/70 174/93 |

(Continued)

FOREIGN PATENT DOCUMENTS

| EP | 1108620 A2 * | 6/2001 | ......... B60R 16/0222 |
|---|---|---|---|
| JP | 2001097143 A * | 4/2001 | |

(Continued)

*Primary Examiner* — Timothy J. Dole
*Assistant Examiner* — Muhammed Azam
(74) *Attorney, Agent, or Firm* — Sughrue Mion, PLLC (57) ABSTRACT

A grommet includes a grommet body, an inner protector, and an outer member. The inner protector includes a protector body accommodated in a protector accommodating chamber of the grommet body and an electric wire guide body projecting toward an outside of the protector accommodating chamber from the protector body. The electric wire guide body is bent such that an intermediate position between a support portion on a side of the protector body and a tip portion is lower than heights of both the support portion and the tip portion with the grommet installed in a vehicle body.

10 Claims, 12 Drawing Sheets

(56) References Cited

U.S. PATENT DOCUMENTS

| | | | | |
|---|---|---|---|---|
| 3,053,564 A * | 9/1962 | Evans | B60J 5/04 | 49/167 |
| 3,868,080 A * | 2/1975 | Olson | H01R 9/2441 | 248/205.1 |
| 4,754,422 A * | 6/1988 | Sakai | G06F 7/535 | 708/650 |
| 4,797,513 A * | 1/1989 | Ono | H02G 3/088 | 16/2.2 |
| 4,829,145 A * | 5/1989 | Mitchell | H02G 3/06 | 174/480 |
| 4,941,258 A * | 7/1990 | Wright | B60R 16/0207 | 29/755 |
| 5,123,862 A | 6/1992 | Suzuki | | |
| 5,279,507 A * | 1/1994 | Kameyama | B60R 16/0222 | 439/270 |
| 5,487,680 A * | 1/1996 | Yamanashi | B60R 16/0222 | 439/34 |
| 5,988,911 A * | 11/1999 | Browne, Jr. | A46B 11/066 | 137/484.2 |
| 6,051,790 A * | 4/2000 | Takeuchi | B60R 16/0207 | 174/70 R |
| 6,070,931 A * | 6/2000 | Yamaguchi | B60R 16/0215 | 296/146.7 |
| 6,081,964 A * | 7/2000 | Mori | B60R 16/0222 | 16/2.2 |
| 6,278,060 B1 * | 8/2001 | Mori | B60R 16/0222 | 174/650 |
| 6,312,046 B1 * | 11/2001 | Sora | B60R 16/0222 | 174/152 G |
| 6,354,651 B1 * | 3/2002 | Mori | B60R 16/0222 | 174/152 G |
| 6,995,317 B1 * | 2/2006 | Dzurilla | B60R 16/0222 | 16/2.1 |
| 7,244,894 B1 * | 7/2007 | Lipp | B60R 16/0222 | 16/2.1 |
| 7,408,115 B2 * | 8/2008 | Doring | H02G 11/00 | 174/69 |
| 7,423,223 B2 * | 9/2008 | Taira | B60S 1/48 | 16/2.1 |
| 7,423,224 B2 * | 9/2008 | Puhi | B60R 16/0215 | 16/2.1 |
| 7,547,059 B2 * | 6/2009 | Delaine | B60R 16/0222 | 174/152 G |
| 7,641,271 B1 * | 1/2010 | Haydin | B60R 16/0222 | 16/2.1 |
| 7,943,854 B1 * | 5/2011 | Lipp | H02G 3/0468 | 16/2.1 |
| 8,070,205 B2 * | 12/2011 | Schermerhorn | A62B 18/088 | 296/26.11 |
| 8,925,147 B2 | 1/2015 | Furuta et al. | | |
| 9,776,582 B2 * | 10/2017 | Kamenoue | B60R 16/027 | |
| 10,207,661 B2 * | 2/2019 | Urashima | B60R 16/0222 | |
| 10,286,859 B2 * | 5/2019 | Limori | B60R 16/0215 | |
| 10,322,686 B2 * | 6/2019 | Urashima | B60R 16/0222 | |
| 10,424,906 B2 * | 9/2019 | Nakai | B60R 16/0222 | |
| 2002/0004967 A1 * | 1/2002 | Saeki | B60R 16/0222 | 16/2.1 |
| 2002/0046863 A1 * | 4/2002 | Heranney | B60R 16/0222 | 174/655 |
| 2002/0096379 A1 * | 7/2002 | Sims | H01R 11/05 | 180/164 |
| 2003/0017027 A1 * | 1/2003 | Nakata | B60R 16/0222 | 411/190 |
| 2003/0056974 A1 * | 3/2003 | Nakata | B60R 16/0222 | 174/151 |
| 2004/0016079 A1 * | 1/2004 | Kameyama | B60R 16/0222 | 16/2.1 |
| 2004/0063359 A1 * | 4/2004 | Hosokawa | B60R 16/0215 | 439/677 |
| 2004/0069521 A1 * | 4/2004 | Shimola | H02G 3/22 | 174/659 |
| 2004/0107533 A1 * | 6/2004 | Nishihara | B60R 16/0222 | 16/2.1 |
| 2004/0154819 A1 * | 8/2004 | Sakata | B60R 16/0222 | 174/650 |
| 2004/0216383 A1 * | 11/2004 | Rogers, Jr. | E05B 85/26 | 49/360 |
| 2006/0090920 A1 * | 5/2006 | Fujita | B60R 16/0207 | 174/72 A |
| 2006/0160385 A1 * | 7/2006 | Tsukamoto | B60R 16/0222 | 439/157 |
| 2006/0162798 A1 * | 7/2006 | Doring | H02G 11/00 | 138/118 |
| 2006/0278423 A1 * | 12/2006 | Ichikawa | H02G 3/0462 | 174/72 A |
| 2007/0148994 A1 * | 6/2007 | Sato | B60R 16/0215 | 439/34 |
| 2009/0101407 A1 * | 4/2009 | Yamamoto | B60R 16/0215 | 174/72 A |
| 2009/0193618 A1 * | 8/2009 | Hakamata | E05D 11/0081 | 16/250 |
| 2010/0000764 A1 * | 1/2010 | Suzuki | H02G 3/0468 | 174/152 G |
| 2010/0025077 A1 * | 2/2010 | Ujita | B60R 16/0222 | 174/153 G |
| 2011/0056730 A1 * | 3/2011 | Kamenoue | B60R 16/0215 | 174/152 G |
| 2011/0265286 A1 * | 11/2011 | Paku | B60R 16/0222 | 16/2.2 |
| 2012/0297572 A1 * | 11/2012 | Stewart | H02G 3/22 | 16/2.2 |
| 2013/0068502 A1 * | 3/2013 | Law | B60R 16/0222 | 174/152 G |
| 2013/0126233 A1 * | 5/2013 | Nagayasu | B60R 16/027 | 174/72 A |
| 2013/0291335 A1 * | 11/2013 | Adachi | B60R 16/0222 | 16/2.1 |
| 2014/0291939 A1 * | 10/2014 | Furuta | B60J 5/0418 | 277/616 |
| 2014/0332265 A1 * | 11/2014 | Nagayasu | B60R 16/0222 | 174/72 A |
| 2014/0353926 A1 * | 12/2014 | Fukuda | B60R 16/0222 | 277/616 |
| 2015/0305174 A1 * | 10/2015 | Yoshimura | B60R 16/0222 | 174/668 |
| 2016/0090050 A1 * | 3/2016 | Froese | B62D 27/023 | 296/29 |
| 2016/0144807 A1 * | 5/2016 | Inao | H02G 3/0468 | 174/72 A |
| 2017/0174154 A1 * | 6/2017 | Kamenoue | H01B 7/0045 | |
| 2017/0246999 A1 * | 8/2017 | Nakagawa | F16L 11/11 | |
| 2018/0083383 A1 * | 3/2018 | Miyakawa | H02G 3/08 | |
| 2018/0222405 A1 * | 8/2018 | Baydoun | B60R 16/0222 | |
| 2018/0222406 A1 * | 8/2018 | Baydoun | B60R 16/0222 | |
| 2018/0304834 A1 * | 10/2018 | Urashima | B60R 16/0222 | |
| 2019/0045678 A1 * | 2/2019 | Ito | H02G 3/0481 | |
| 2019/0244730 A1 * | 8/2019 | Kushima | B60R 16/02 | |
| 2019/0389403 A1 * | 12/2019 | Yokoyama | B60J 5/0418 | |

FOREIGN PATENT DOCUMENTS

| | | | |
|---|---|---|---|
| JP | 2005349984 A | * | 12/2005 |
| JP | 2008-195182 A | | 8/2008 |
| JP | 2009227000 A | * | 10/2009 |
| JP | 2012-178907 A | | 9/2012 |
| JP | 2013-132167 A | | 7/2013 |
| JP | 2013172611 A | * | 9/2013 |
| JP | 2014111416 A | * | 6/2014 |
| JP | 2015042048 A | * | 3/2015 |
| JP | 2015-204730 A | | 11/2015 |

\* cited by examiner

GROMMET

CROSS REFERENCE TO RELATED APPLICATION

This application is based upon and claims the benefit of priority from the prior Japanese Patent Application No. 2018-118963, filed on Jun. 22, 2018, the entire contents of which are incorporated herein by reference.

BACKGROUND

1. Technical Field

The disclosure relates to a grommet into which an electric wire of a wire harness is inserted for protection.

2. Related Art

JP 2015-204730 A proposes a grommet including a protector accommodating a wire harness and a grommet body including a protector accommodating space accommodating the protector. The grommet is mounted in a grommet accommodating recessed portion formed in a door panel of a vehicle. In the grommet, a bulging portion of a grommet base portion of the grommet body brought into contact with the grommet accommodating recessed portion of the door panel serves as a water stopping surface. A plurality of lip portions are formed in the water stopping surface. The plurality of lip portions of the bulging portion of the grommet base portion are brought into contact with the water stopped surface of the grommet accommodating recessed portion of the door panel, whereby water can be stopped between the grommet base portion and the water stopped surface.

SUMMARY

In the grommet, the protector base portion of the protector includes an electric wire insertion opening into which an electric wire of the wire harness is inserted, and a bundle portion for bundling the wire harness is arranged so as to project on the electric wire insertion opening side. For this reason, water flowing along the electric wire of the wire harness in the door may infiltrate into the protector accommodating space in the grommet body from the electric wire insertion opening of the protector base portion.

The disclosure is directed to a grommet capable of draining water along an electric wire before infiltrating into a grommet body.

A grommet in accordance with some embodiments includes: a grommet body formed of an elastic body and including a protector accommodating chamber in the grommet body, wherein an electric wire is inserted into the grommet body; an inner protector formed of a member having a higher rigidity than a rigidity of the grommet body and accommodated in the protector accommodating chamber; and an outer member formed of a member having a higher rigidity than the rigidity of the grommet body, the outer member being configured to mount the grommet body with the inner protector accommodated in the protector accommodating chamber with the grommet body sandwiched between the outer member and a grommet accommodating recessed portion of an attachment panel. The inner protector includes a protector body accommodated in the protector accommodating chamber of the grommet body, and an electric wire guide body projecting toward an outside of the protector accommodating chamber from the protector body. The electric wire guide body is bent such that an intermediate position between a support portion on a side of the protector body and a tip portion is lower than heights of both the support portion and the tip portion with the grommet installed in a vehicle body.

According to the above configuration, the electric wire guide body is bent so that the intermediate position between the support portion on the protector body side of the electric wire guide body and the tip portion is lower than the heights of both the support portion and the tip portion, whereby a portion located between the support portion and the tip portion serves as a water draining portion. For this reason, water flowing along the electric wire derived from the electric wire guide body in the attachment panel can be reliably drained before infiltrating into the protector accommodating chamber in the grommet body.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 1:
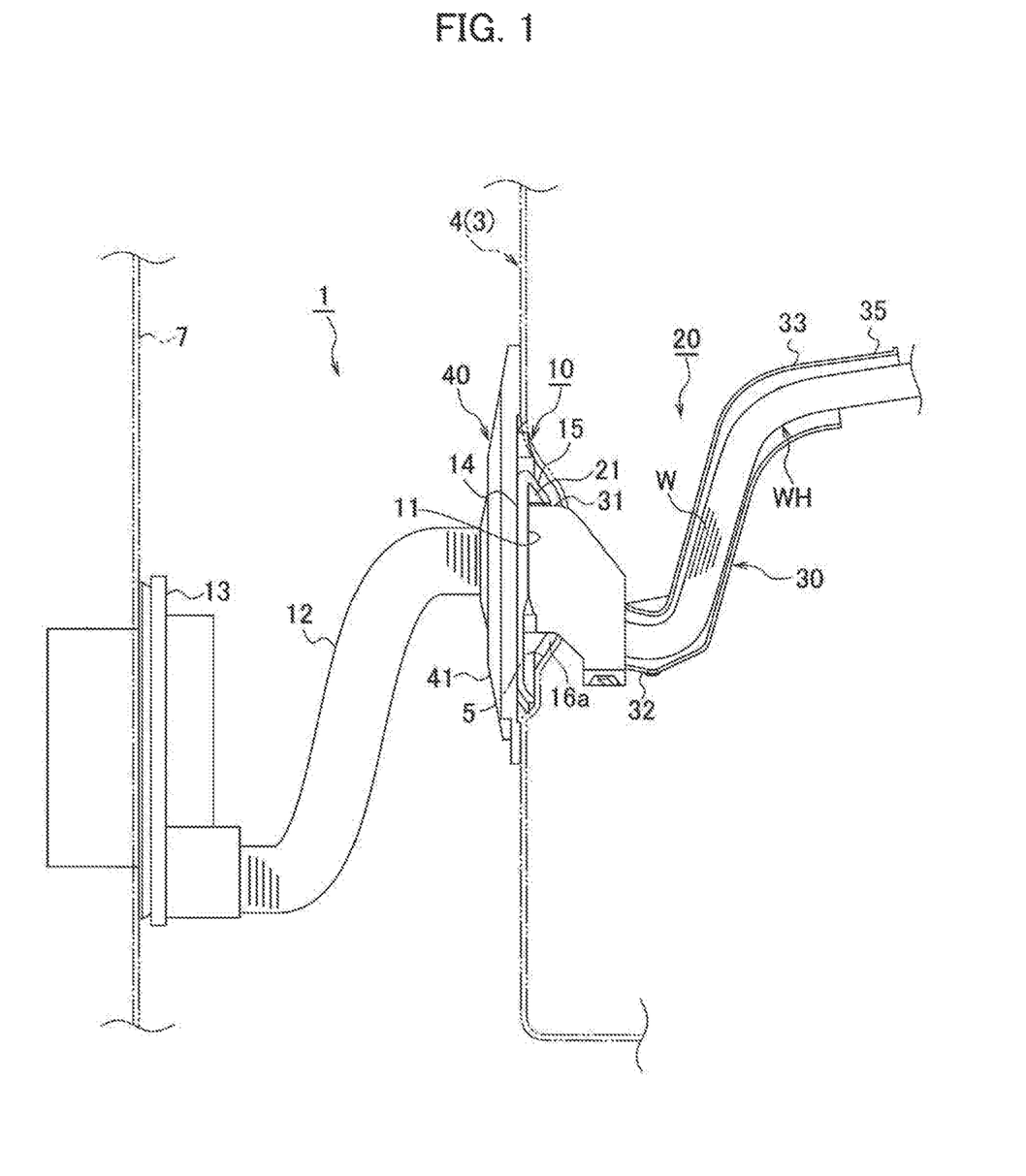
FIG. 1 is a side view illustrating an attached state of a grommet of an embodiment.
Figure 2:
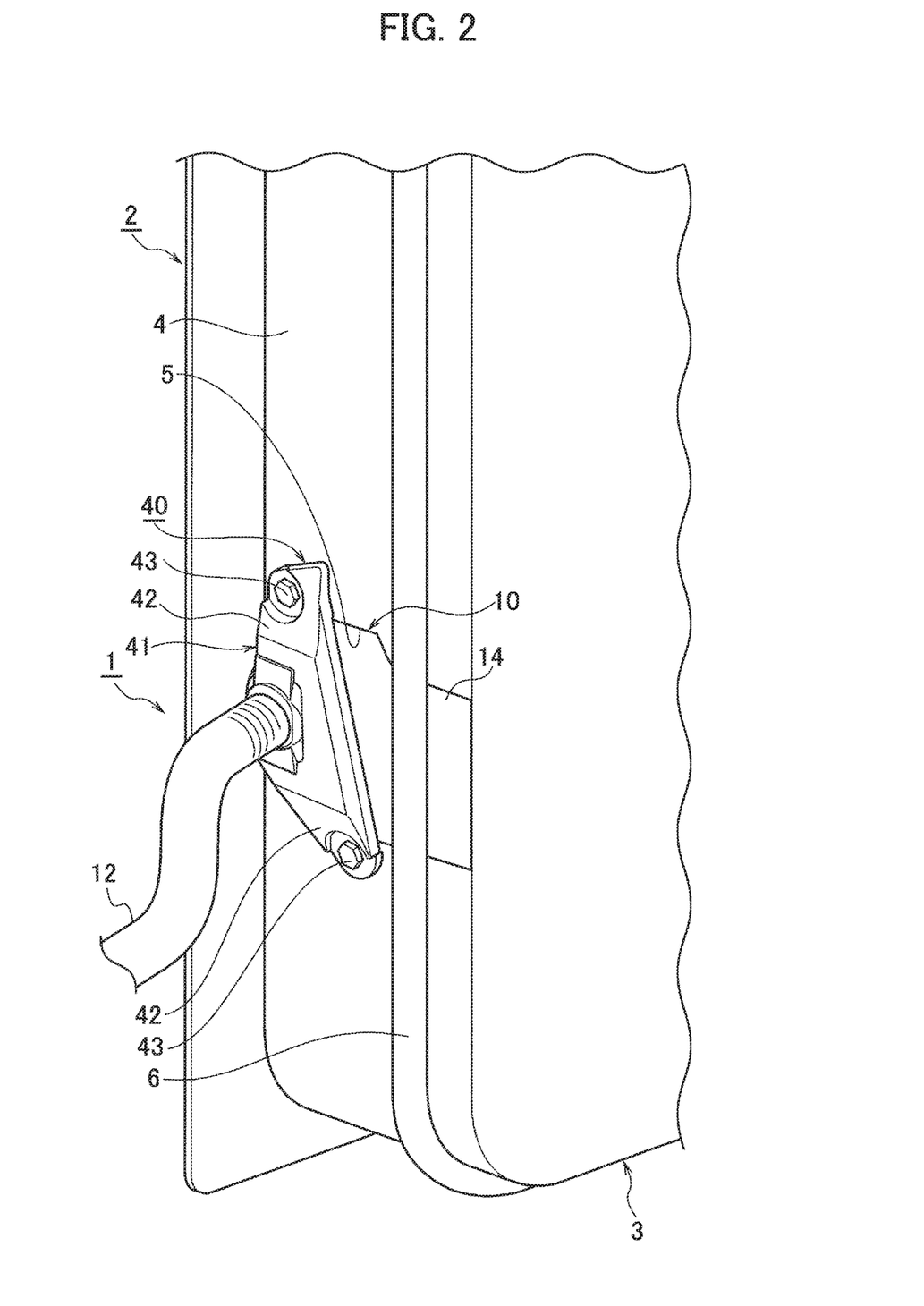
FIG. 2 is a partial perspective view of an essential portion illustrating the attached state of the grommet of FIG. 1.
Figure 3:
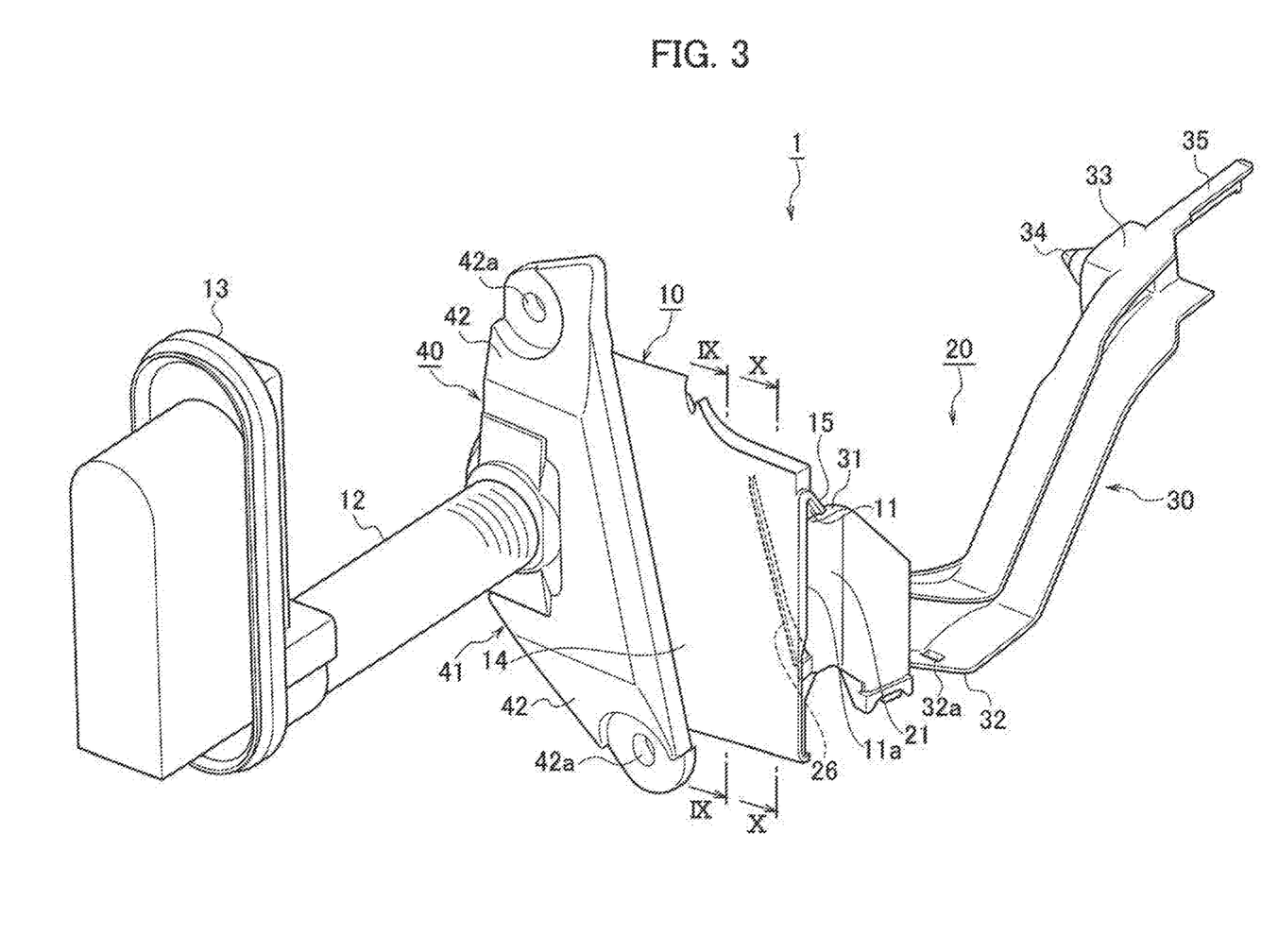
FIG. 3 is a perspective view of the grommet of FIG. 1 as viewed from the front side.
Figure 4:
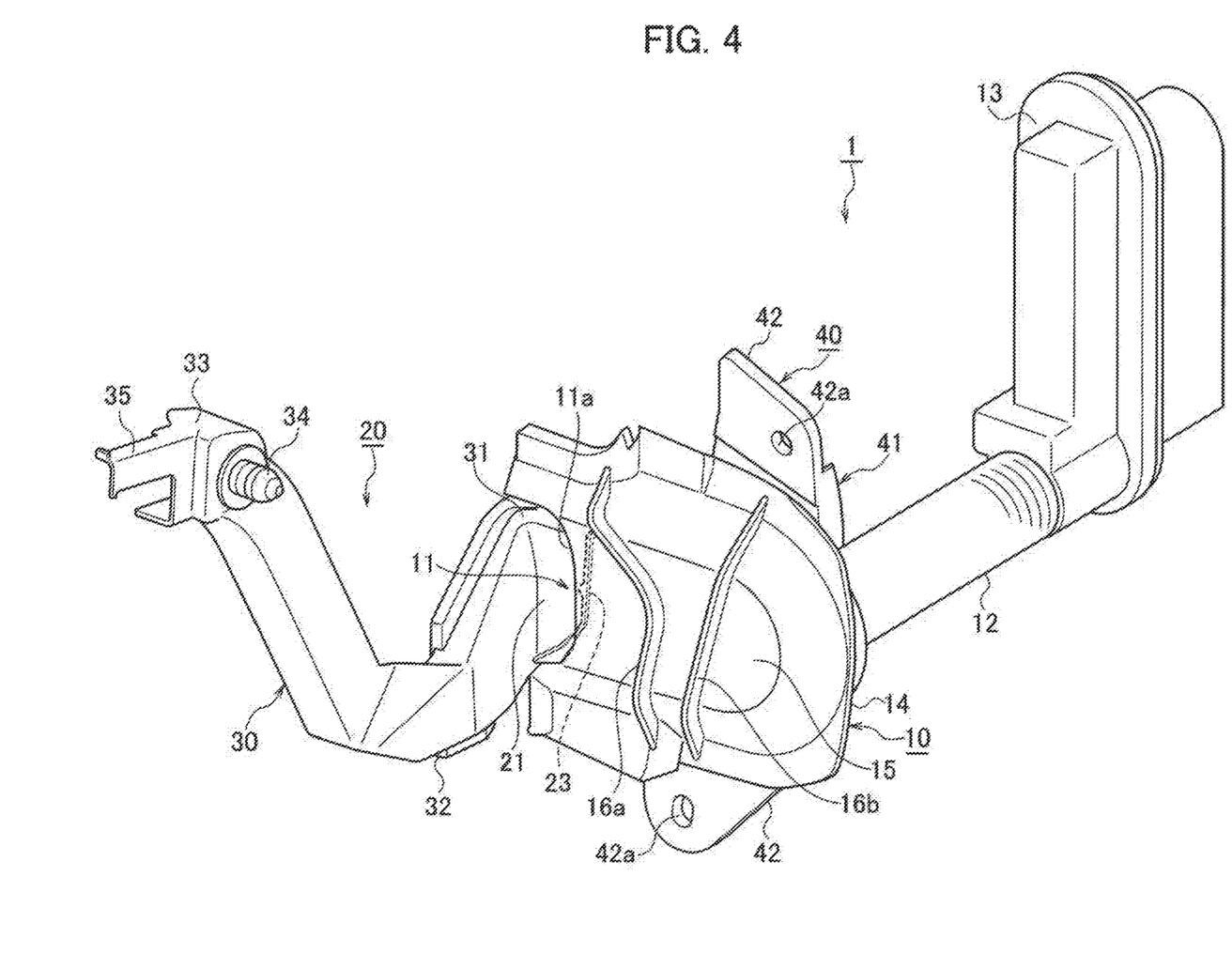
FIG. 4 is a rear view of the grommet of FIG. 1 as viewed from the rear side.
Figure 5:
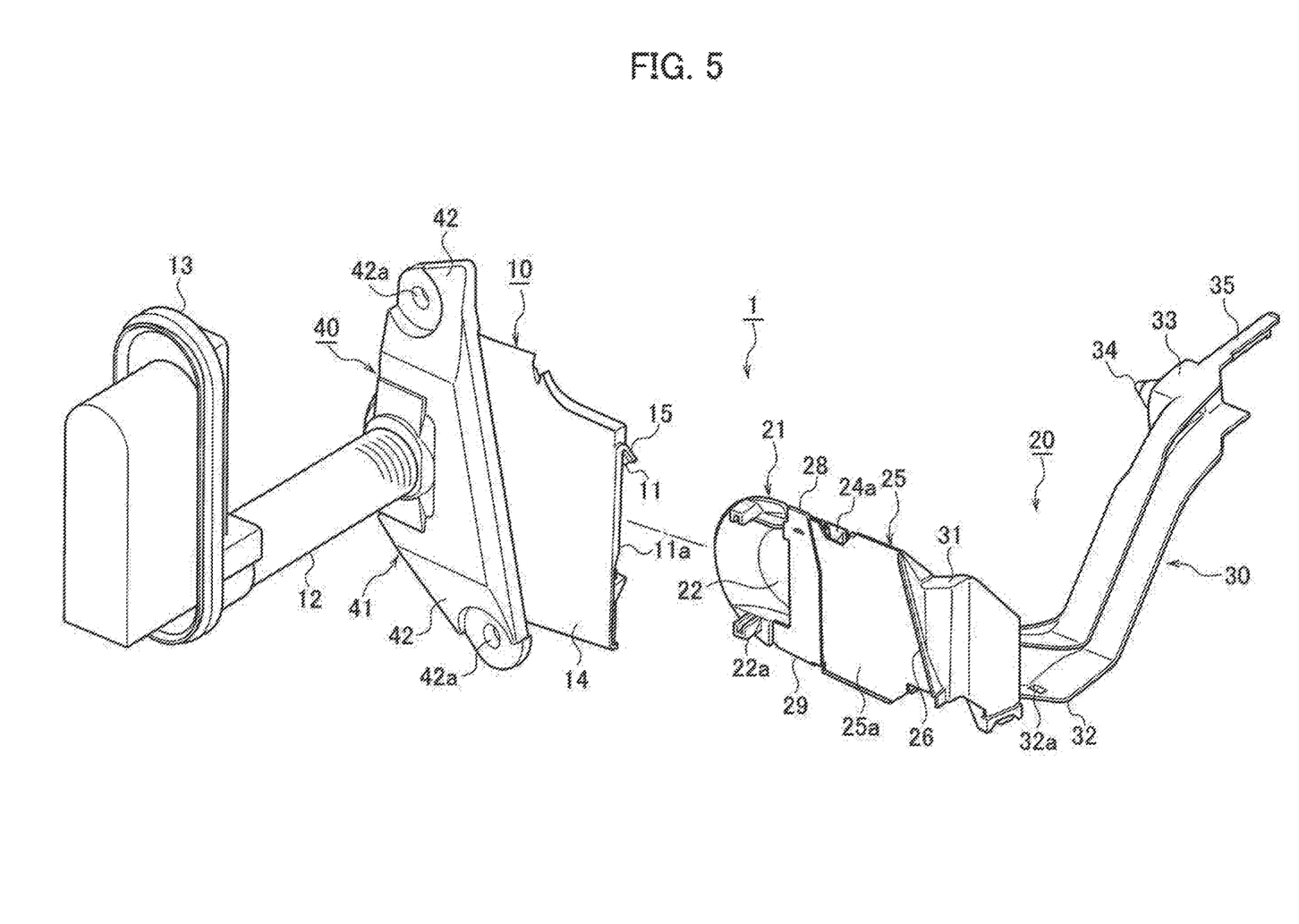
FIG. 5 is an exploded perspective view of the grommet of FIG. 1.
Figure 6:
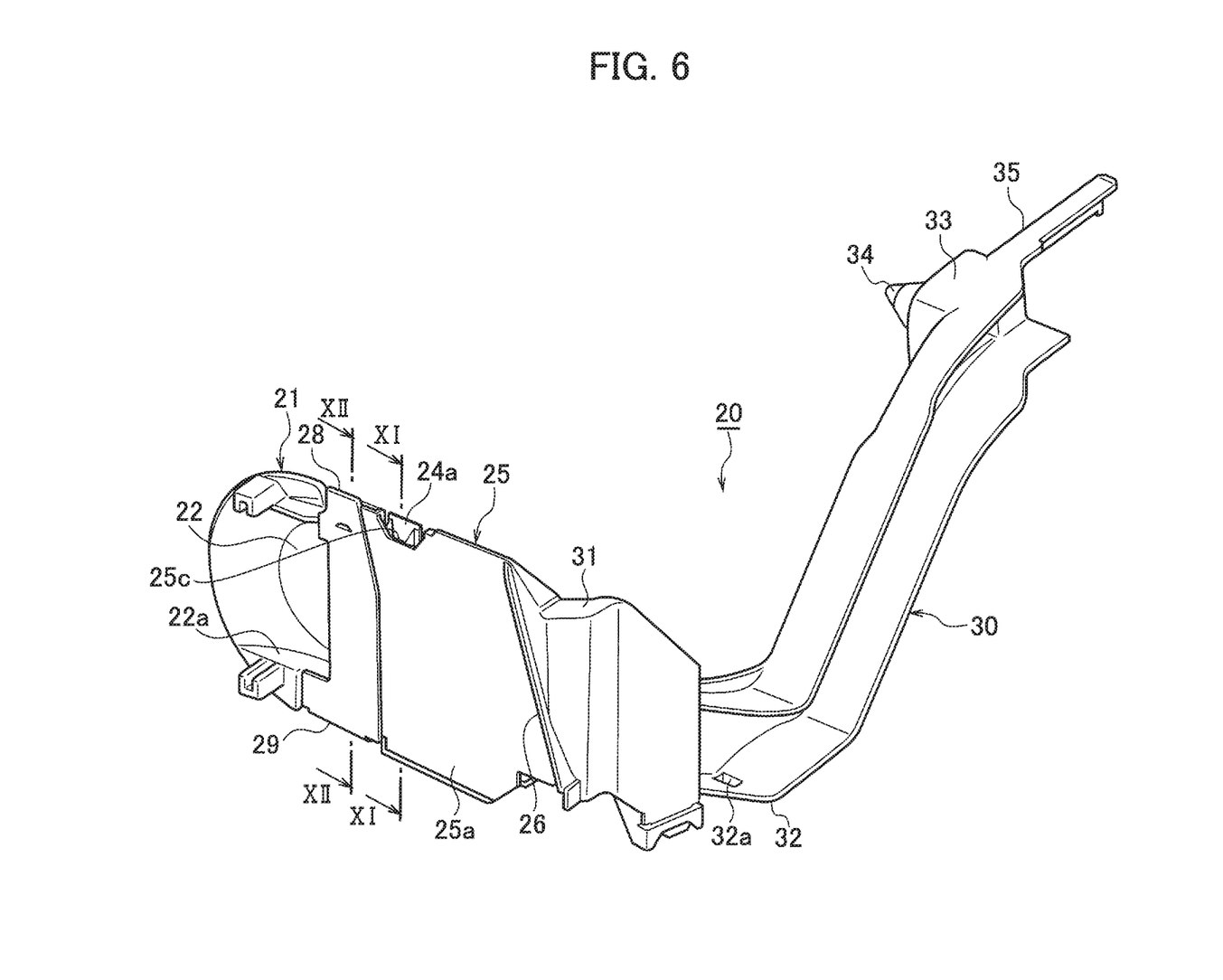
FIG. 6 is a perspective view of an inner protector used in the grommet of FIG. 1 as viewed from the front side.
Figure 7:
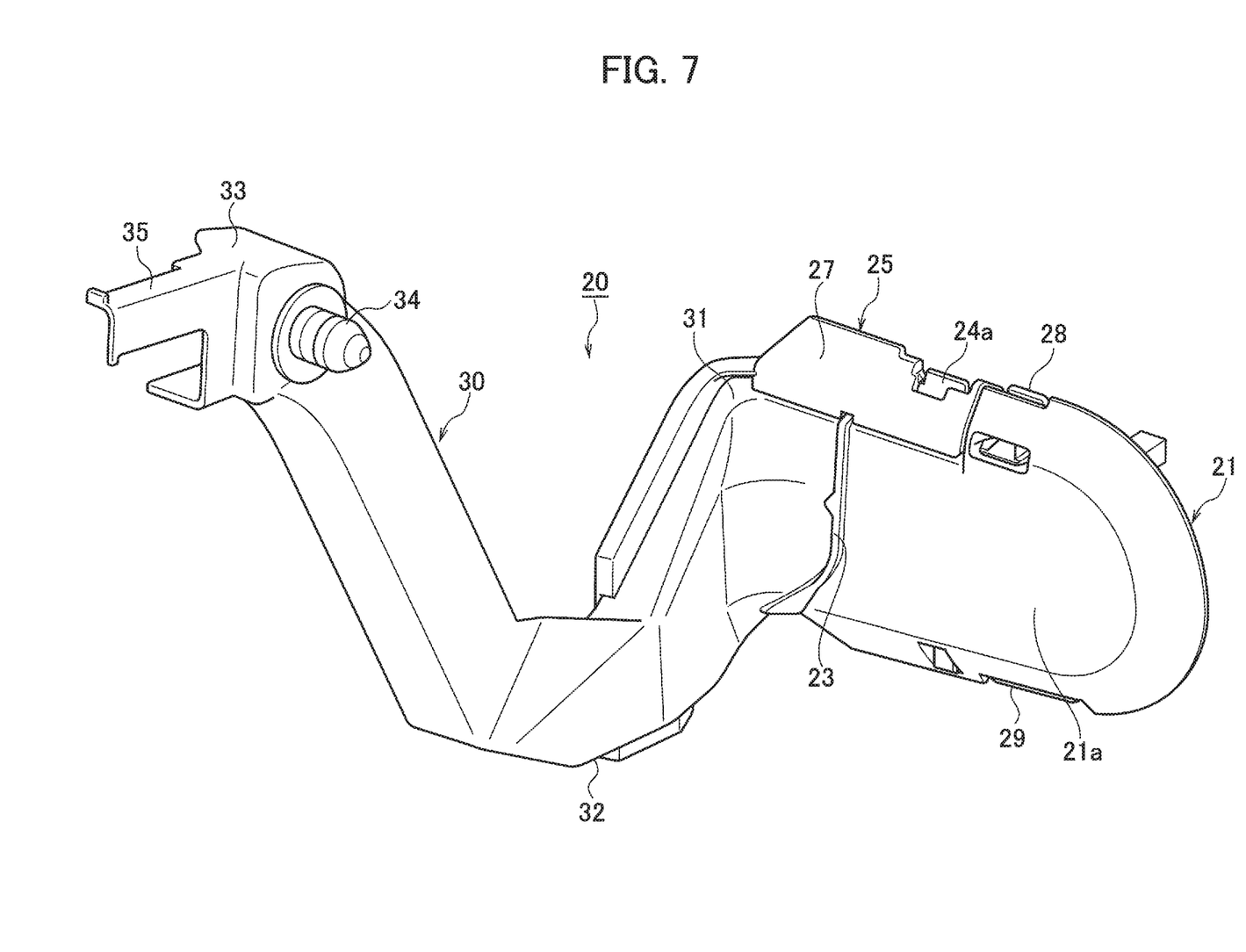
FIG. 7 is a perspective view of the inner protector of FIG. 6 as viewed from the rear side.
Figure 8:
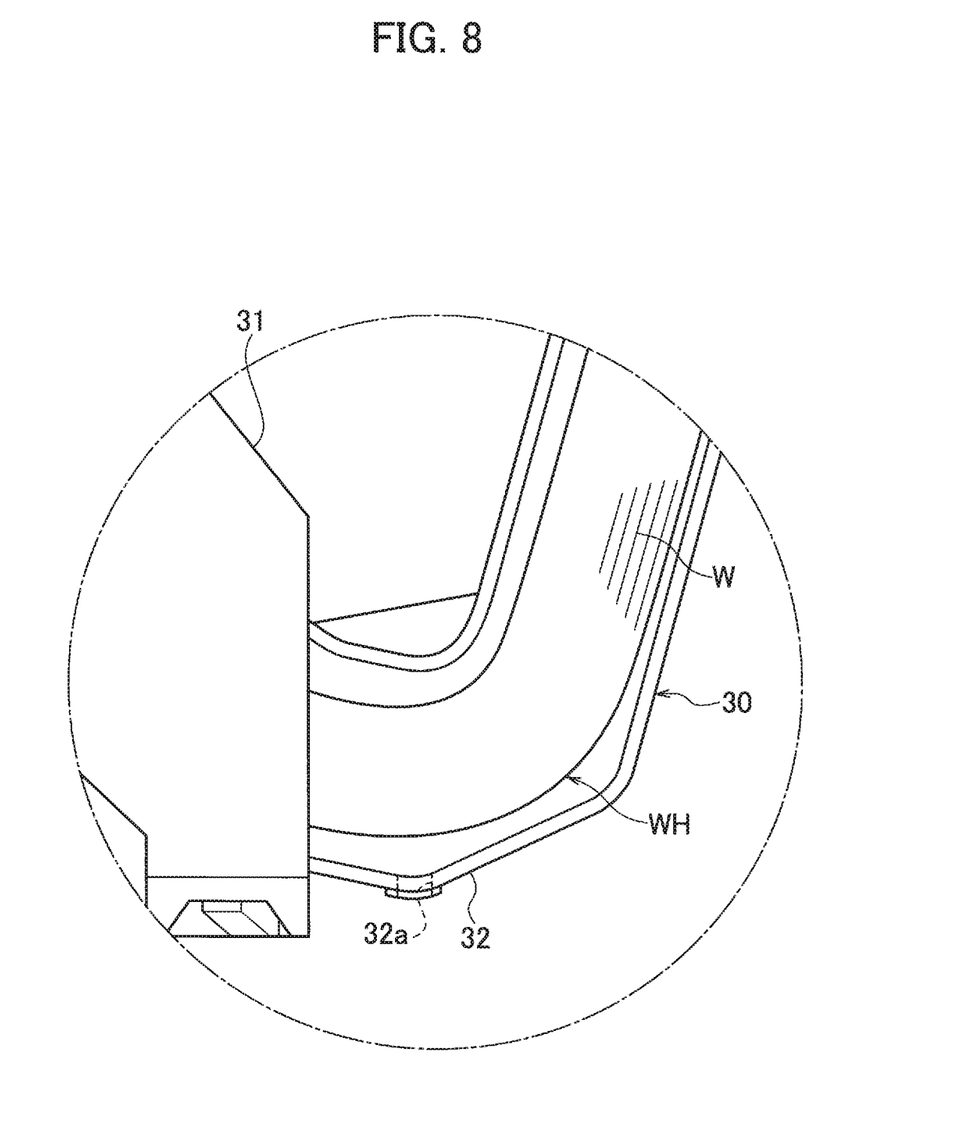
FIG. 8 is an enlarged side view of a water draining portion of the inner protector of FIG. 6.
Figure 9:
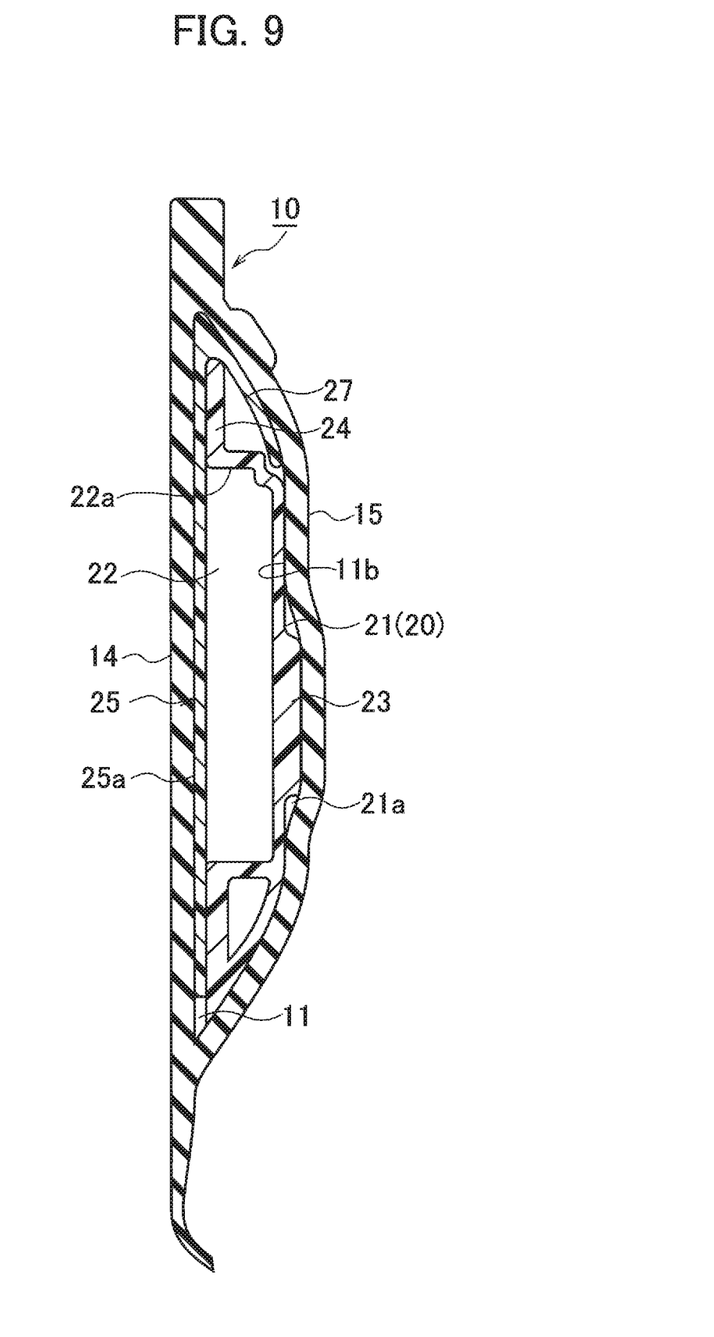
FIG. 9 is a cross-sectional view taken along line IX-IX in FIG. 3.
Figure 10:
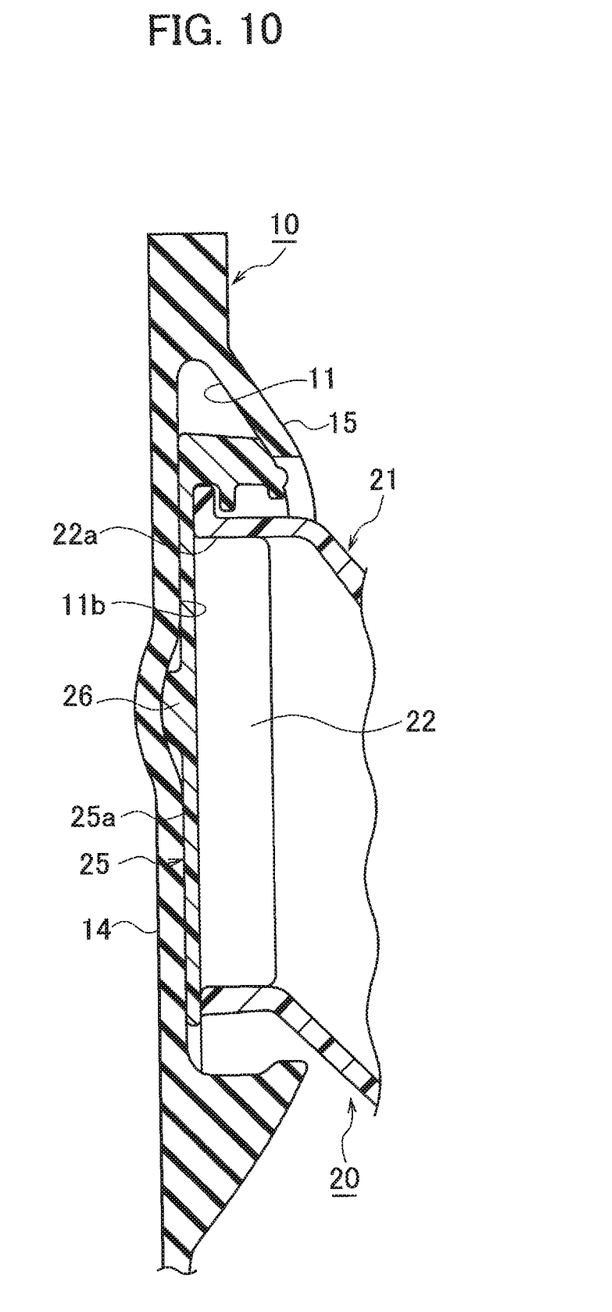
FIG. 10 is a cross-sectional view taken along line X-X in FIG. 3.
Figure 11:
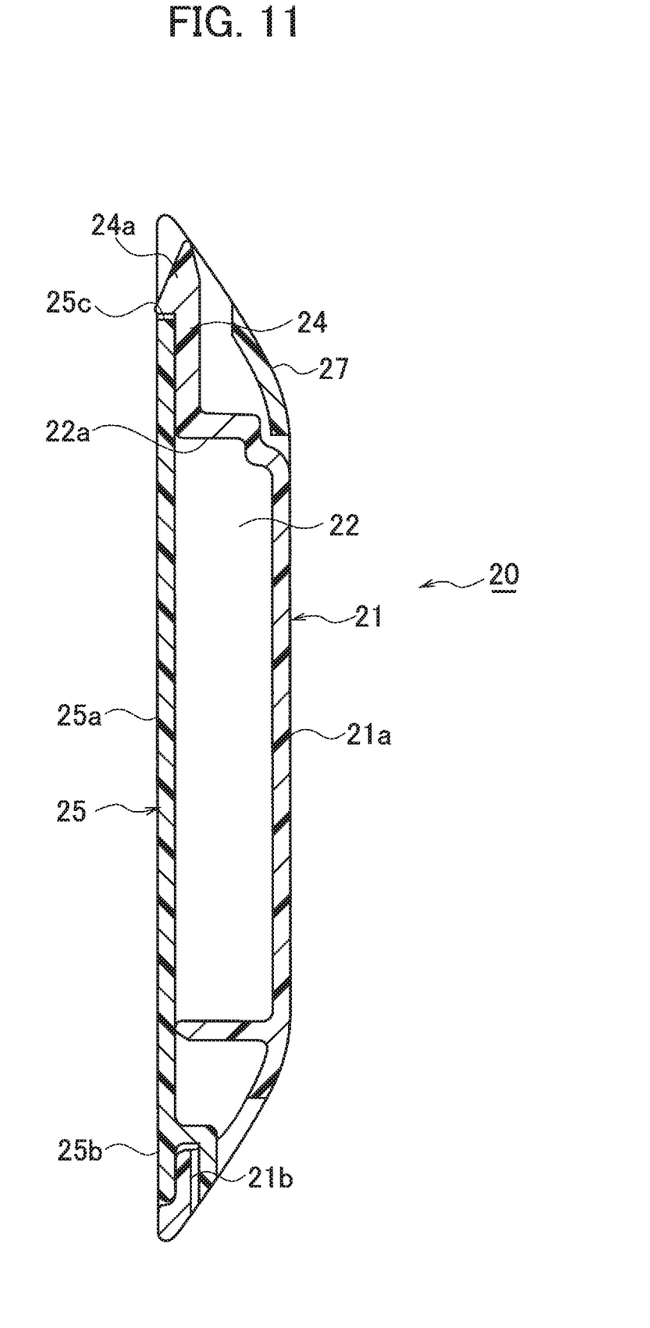
FIG. 11 is a cross-sectional view taken along line XI-XI in FIG. 6.
Figure 12:
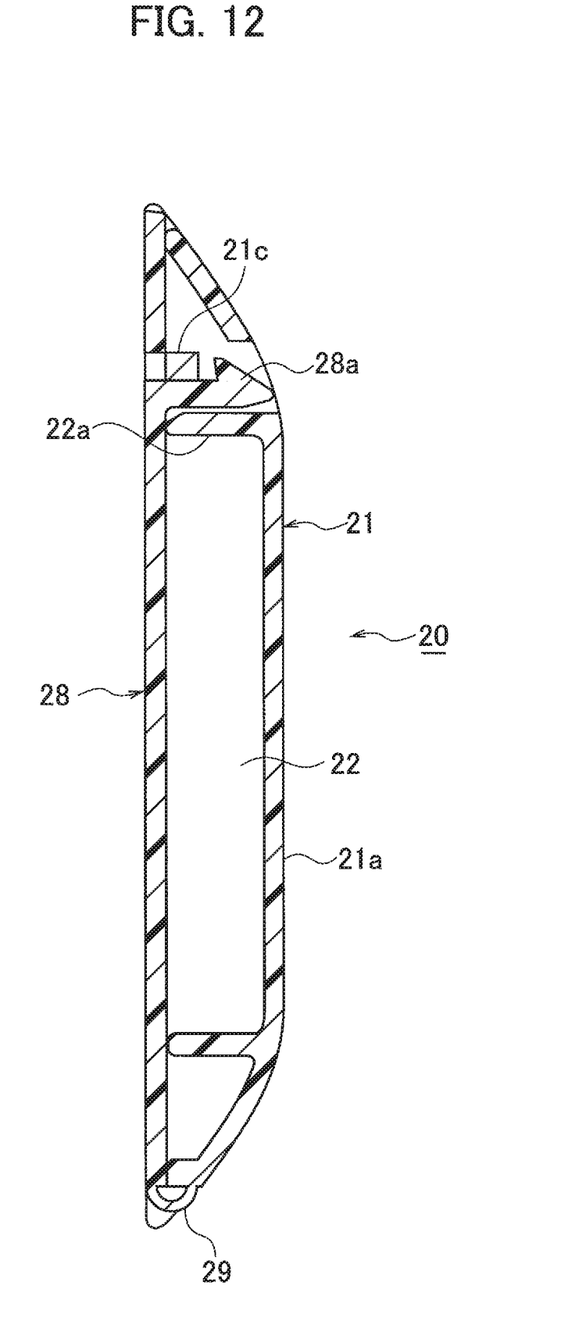
FIG. 12 is a cross-sectional view taken along line XII-XII in FIG. 6.

FIG. 1 is a side view illustrating an attached state of a grommet 1 of an embodiment; FIG. 2 is a partial perspective view of an essential portion illustrating the attached state of the grommet 1; FIG. 3 is a perspective view of the grommet 1 as viewed from the front side; FIG. 4 is a rear view of the grommet 1 as viewed from the rear side; FIG. 5 is an exploded perspective view of the grommet 1; FIG. 6 is a perspective view of an inner protector 20 used in the grommet 1 as viewed from the front side; FIG. 7 is a perspective view of the inner protector 20 as viewed from the rear side; FIG. 8 is an enlarged side view of a water draining portion of the inner protector 20; FIG. 9 is a cross-sectional view taken along line IX-IX in FIG. 3; FIG. 10 is a cross-sectional view taken along line X-X in FIG. 3; FIG. 11 is a cross-sectional view taken along line XI-XI in FIG. 6; and FIG. 12 is a cross-sectional view taken along line XII-XII in FIG. 6.

As illustrated in FIGS. 1 and 2, the grommet 1 protects an electric wire W of a wire harness WH arranged so as to straddle between a door (attachment body) 2 and a body (vehicle body) 7 of an automobile in a state where the electric wire W is inserted into the grommet 1. The grommet 1 includes a grommet body 10, an inner protector 20, and an outer member 40. The grommet body 10 is formed of an elastic body such as rubber. A protector accommodating chamber 11 is formed in the grommet body 10, and the electric wire W is inserted into the grommet body 10. The inner protector 20 is formed of a member having rigidity higher than that of the grommet body 10 and made of synthetic resin and the like, and is accommodated in the protector accommodating chamber 11. The outer member 40 is formed of a member having rigidity higher than that of the grommet body 10 and made of synthetic resin and the like. The outer member 40 mounts the grommet body 10 in which the inner protector 20 arranged in a grommet accommodating recessed portion 5 of a hinge side end face 4 of a door panel (attachment panel) 3 is accommodated in the protector accommodating chamber 11 with the grommet body 10 sandwiched between the grommet accommodating recessed portion 5 of the door panel 3 and the outer member 40.

As illustrated in FIGS. 1 to 5, the grommet body 10 made of rubber and the like is a sealing member for applying water stop between the grommet accommodating recessed portion 5 of the door panel 3 and the grommet body 10, and has the hollow protector accommodating chamber 11. The protector accommodating chamber 11 has a shape corresponding to that of the inner protector 20. The protector accommodating chamber 11 has a one end-side opening 11a. The opening 11a is an insertion hole of the inner protector 20. The other end side of the protector accommodating chamber 11 is in communication with a tubular portion 12 integrally formed so as to project on the grommet body 10. The tubular portion 12 is a concertina elastic tube into which the electric wire W of the wire harness WH is inserted. On the tip side of the tubular portion 12, a vehicle body-side grommet portion 13 extended to the body 7 side and attached to the body 7 is provided. As illustrated in FIG. 1, the vehicle body-side grommet portion 13 is arranged at a position lower than the mounting position of the outer member 40.

The surface of the grommet body 10 is a flat portion 14, and a weather strip 6 is laminated on the surface-side flat portion 14.

The water stopping surface as the rear surface of the grommet body 10 is a bulging portion 15 brought into contact with the grommet accommodating recessed portion 5 of the door panel 3, and a pair of water stop lips 16a and 16b are integrally formed so as to project on the bulging portion 15. The pair of water stop lips 16a and 16b of the bulging portion 15 of the grommet body 10 are brought into contact with the surface of the grommet accommodating recessed portion 5 of the door panel 3 to stop water between the surface and the grommet body 10.

As illustrated in FIGS. 5 to 7, the inner protector 20 made of synthetic resin and the like includes a protector body 21, a large rectangular plate-shaped cover (lid) 25 made of synthetic resin and the like, a small rectangular plate-shaped cover (lid) 28 made of synthetic resin and the like, and an electric wire guide body 30. The protector body 21 includes an electric wire insertion chamber 22, and is accommodated in the protector accommodating chamber 11 of the grommet body 10. The large rectangular plate-shaped cover 25 and the small rectangular plate-shaped cover 28 cover an opening 22a of the electric wire insertion chamber 22 of the protector body 21. The electric wire guide body 30 projects toward the outside of the protector accommodating chamber 11 from the protector body 21.

The protector body 21 includes upper and lower edge portions formed in a curved surface shape so as to form a space of the electric wire insertion chamber 22, and a grommet body 10 side end edge formed in an arc curved surface shape. The protector body 21 includes an outer surface 21a including a rib 23 integrally formed so as to project on the outer surface 21a, as illustrated in FIGS. 7 and 9. The rib 23 projects toward an inner surface 11b of the protector accommodating chamber 11 of the grommet body 10, and includes a lower edge inclined toward a support portion 31 side of the electric wire guide body 30 along a direction toward the lower side from the upper side in a state where the grommet 1 is installed in a vehicle.

As illustrated in FIGS. 6 and 10, a rib 26 is integrally formed so as to project also on an outer surface 25a of the large rectangular plate-shaped cover 25. The outer surface 25a of the large rectangular plate-shaped cover 25 covers the opening 22a of the electric wire insertion chamber 22 of the protector body 21. The rib 26 includes a lower edge projecting toward the inner surface 11b of the protector accommodating chamber 11 of the grommet body 10, and is inclined at an oblique angle toward a support portion 31 side of the electric wire guide body 30 from the upper end side along a direction toward the lower side from the upper side in a state where the grommet 1 is installed in a vehicle. As a result, the ribs 23 and 26 are arranged around the outer surface 21a of the protector body 21 and the outer surface 25a of the large rectangular plate-shaped cover 25 so that water easily flows along the ribs 23 and 26 of the outer surfaces 21a and 25a. This makes it possible to suppress or prevent the infiltration of the water into the protector accommodating chamber 11 in the grommet body 10.

As illustrated in FIG. 9, the upper edge portion of the protector body 21 includes a projecting wall portion 24 projecting to the outside of the opening 22a of the electric wire insertion chamber 22. The upper edge end of the large rectangular plate-shaped cover 25 includes an overhang wall portion 27 extended to the outside of a region covering the opening 22a of the electric wire insertion chamber 22 and covering the projecting wall portion 24 so as to surround the projecting wall portion 24. As a result, the water flowing from the upper side of the protector body 21 flows to the outer surface 21a side of the protector body 21 along the overhang wall portion 27, whereby the water does not hit the wire harness WH in the electric wire insertion chamber 22 of the protector body 21.

As illustrated in FIG. 11, the large rectangular plate-shaped cover 25 is openably and closably attached to the protector body 21 by locking a locking recessed portion 25c formed on the upper end portion to a locking projection 24a formed on the projecting wall portion 24 on the upper edge end side of the protector body 21 in a state where an engaging fork portion 25b formed on the lower end portion is engaged with a locking portion 21b formed on a lower end edge portion of the protector body 21.

As illustrated in FIG. 12, the small rectangular plate-shaped cover 28 is openably and closably supported via a hinge portion 29 integrally formed on the lower end edge portion of the protector body 21. The small rectangular plate-shaped cover 28 is attached to the protector body 21 by locking a locking projection hole 28a formed on the upper end portion to a locking wall portion 21c on the upper edge end side of the protector body 21.

As illustrated in FIGS. 1, and 3 to 7, the electric wire guide body 30 includes an inner space having a U-shaped cross section excluding the rectangular cylindrical support portion 31, and accommodates the electric wire W of the wire harness WH to derive the wire harness WH to a predetermined position in the door 2. The electric wire guide body 30 is integrally formed so as to project on the protector body 21. The electric wire guide body 30 is bent so that an intermediate position between the support portion 31 on the protector body 21 side and a tip portion 33 is lower than heights of both the support portion 31 and the tip portion 33 in a state where the grommet 1 is installed in the vehicle. That is, as illustrated in FIGS. 4 to 8, the electric wire guide body 30 is bent in a V-shape at an oblique angle so as to gradually lower toward the intermediate position from the support portion 31 and the tip portion 33. As illustrated in FIG. 8, a drainage hole 32a is formed in an intermediate portion 32 located at the lowest position between the support portion 31 and the tip portion 33.

A clamp 34 for attaching a door panel is integrally formed so as to project on the side surface of the tip portion 33 of the electric wire guide body 30. A bundling piece portion 35 for bundling the wire harness WH with a bundling band and the like is provided so as to project on the tip of the tip portion 33.

As illustrated in FIGS. 1 to 5, the outer member 40 is a fixing member for fixing the grommet body 10 to the grommet accommodating recessed portion 5 of the door panel 3, and includes a body portion 41 and a pair of fixing portions 42 and 42. The outer member 40 is fastened and fixed to the door panel 3 via a bolt 43 inserted into a bolt hole 42a formed in each of the pair of fixing portions 42 and 42.

As described above, the grommet 1 according to the embodiment is bent so that the intermediate portion 32 located between the support portion 31 on the protector body 21 side of the electric wire guide body 30 and the tip portion 33 is lower than the heights of both the support portion 31 and the tip portion 33. As a result, the intermediate portion 32 serves as a water draining portion, whereby the water flowing along the electric wire W of the wire harness WH derived from the electric wire guide body 30 in the door 2 can be certainty drained to the lower side of the vehicle. This makes it possible to suppress or prevent the infiltration of the water into the protector accommodating chamber 11 in the grommet body 10. In particular, by forming the drainage hole 32a in the intermediate portion 32, the water flowing along the electric wire W of the wire harness WH can be easily and reliably drained to the lower side of the door 2 before infiltrating into the protector accommodating chamber 11 in the grommet body 10.

As described above, the water along the electric wire W of the wire harness WH in the door 2 is drained before infiltrating into the grommet body 10, which makes it possible to prevent the water from flowing (infiltrating) to the body 7 side from the door 2 side. As illustrated in FIG. 1, this makes it possible to increase the degree of freedom of route design in which the vehicle body-side grommet portion 13 of the grommet 1 is located at a position lower than the mounting position of the outer member 40 on the door 2 side (the route design of the wire harness WH arranged so as to straddle to the body 7 side from the door 2 side).

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A grommet comprising:
    a grommet body formed of an elastic body and including a protector accommodating chamber in the grommet body, wherein an electric wire is inserted into the grommet body;
    an inner protector formed of a member having a higher rigidity than a rigidity of the grommet body and accommodated in the protector accommodating chamber; and
    an outer member formed of a member having a higher rigidity than the rigidity of the grommet body, the outer member being configured to mount the grommet body with the inner protector accommodated in the protector accommodating chamber with the grommet body sandwiched between the outer member and a grommet accommodating recessed portion of an attachment panel, wherein
    the outer member is on the opposite side of the grommet body from the inner protector, and the inner protector includes
    a protector body accommodated in the protector accommodating chamber of the grommet body,
    a rib positioned on an outer surface of the protector body that projects towards an inner surface of the protector accommodating chamber, and
    an electric wire guide body projecting toward an outside of the protector accommodating chamber from the protector body, and
    the electric wire guide body is bent such that an intermediate position between a support portion on a side of the protector body and a tip portion is lower than heights of both the support portion and the tip portion with the grommet installed in a vehicle body.

2. The grommet according to claim 1, wherein the electric wire guide body is bent at an oblique angle so as to be gradually lower toward the intermediate position from the support portion and the tip portion.

3. The grommet according to claim 1, further comprising a drainage hole formed in the intermediate position located between the support portion and the tip portion in a door panel.

4. The grommet according to claim 1, wherein
    the outer member is mounted in the grommet accommodating recessed portion of a door panel as the attachment panel via the grommet body, and the grommet further comprises a vehicle body-side grommet portion extending from the grommet body toward the vehicle body, attached to the vehicle body, and arranged at a position lower than a mounting position of the outer member.

5. The grommet according to claim 1, wherein the intermediate position containing a drainage hole is an enclosed tubular member.

6. The grommet according to claim 5, wherein the drainage hole is formed in the intermediate position located at the lowest position between the support portion and the tip portion.

7. The grommet according to claim 1, wherein a lower portion of the rib is inclined towards the electric wire guide body.

8. The grommet according to claim 1, wherein the inner protector further comprises a plate-shaped cover that is configured to cover an opening of an electric wire insertion chamber of the protector body.

9. The grommet according to claim 8, wherein the plate-shaped cover further comprises a second rib positioned on an outer surface of the plate-shaped cover and projecting toward the inner surface of the protector accommodating chamber.

10. The grommet according to claim 9, wherein a lower portion of the second rib is inclined at an oblique angle towards the electric wire guide body.

* * * * *